United States Patent
Xu et al.

(10) Patent No.: US 11,923,527 B2
(45) Date of Patent: Mar. 5, 2024

(54) PHOSPHORUS-CARBON COMPOSITES AS BATTERY ANODE MATERIALS

(71) Applicant: UChicago Argonne, LLC, Chicago, IL (US)

(72) Inventors: Guiliang Xu, Downers Grove, IL (US); Zonghai Chen, Bolingbrook, IL (US); Khalil Amine, Oak Brook, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 527 days.

(21) Appl. No.: 17/017,081

(22) Filed: Sep. 10, 2020

(65) Prior Publication Data

US 2021/0013485 A1 Jan. 14, 2021

Related U.S. Application Data

(63) Continuation of application No. 15/006,456, filed on Jan. 26, 2016, now abandoned.

(51) Int. Cl.
| | |
|---|---|
| *H01M 10/054* | (2010.01) |
| *H01M 4/04* | (2006.01) |
| *H01M 4/13* | (2010.01) |
| *H01M 4/131* | (2010.01) |
| *H01M 4/134* | (2010.01) |
| *H01M 4/139* | (2010.01) |
| *H01M 4/38* | (2006.01) |
| *H01M 4/525* | (2010.01) |
| *H01M 4/62* | (2006.01) |
| *H01M 10/0525* | (2010.01) |
| *H01M 10/0568* | (2010.01) |
| *H01M 10/0569* | (2010.01) |

(52) U.S. Cl.
CPC ............. *H01M 4/13* (2013.01); *H01M 4/043* (2013.01); *H01M 4/131* (2013.01); *H01M 4/134* (2013.01); *H01M 4/139* (2013.01); *H01M 4/38* (2013.01); *H01M 4/382* (2013.01); *H01M 4/525* (2013.01); *H01M 4/621* (2013.01); *H01M 4/625* (2013.01); *H01M 10/0525* (2013.01); *H01M 10/054* (2013.01); *H01M 10/0568* (2013.01); *H01M 10/0569* (2013.01)

(58) Field of Classification Search
CPC ........ H01M 4/13; H01M 4/043; H01M 4/131; H01M 4/134; H01M 4/139; H01M 4/38; H01M 4/382; H01M 4/525; H01M 4/621; H01M 4/625; H01M 10/0525; H01M 10/054; H01M 10/0568; H01M 10/0569; H01M 4/362; H01M 4/587; Y02E 60/10
See application file for complete search history.

(56) References Cited

U.S. PATENT DOCUMENTS

| | | | |
|---|---|---|---|
| 2008/0038626 A1* | 2/2008 | Park .................. | H01M 4/58 423/322 |
| 2013/0224369 A1* | 8/2013 | Wang ................ | B82Y 30/00 427/69 |
| 2016/0133932 A1* | 5/2016 | Liang ................ | C01B 32/10 429/231.7 |
| 2016/0215401 A1* | 7/2016 | Rantala ............. | H01M 4/502 |
| 2016/0268017 A1* | 9/2016 | Kitamura ........... | H05K 9/0079 |
| 2016/0301103 A1* | 10/2016 | Kim .................. | H01M 10/0567 |
| 2016/0379764 A1* | 12/2016 | Tour ................. | H01B 1/02 429/223 |
| 2017/0047581 A1* | 2/2017 | Lu .................... | H01M 4/1395 |
| 2017/0092439 A1* | 3/2017 | Hahn ................ | H01G 11/06 |
| 2017/0170669 A1* | 6/2017 | Wang ................ | H01M 10/42 |

OTHER PUBLICATIONS

Decision on Appeal in U.S. Appl. No. 15/006,456, mailed on Jul. 16, 2020.
Qian, J. et al., "Synergistic Na-Storage Reactions in Sn4P3 as a High-Capacity, Cycle-stable Anode of Na-Ion Batteries," Nano Lett., 2014, 14, pp. 1865-1869.
Song, J. et al., "Chemically Bonded Phosphorus/Graphene Hybrid as a High Performance Anode for Sodium-Ion Batteries," Nano Lett., 2014, 14, pp. 6329-6335.
Sun, J. et al., "A phosphorene-graphene hybrid material as a high-capacity anode for sodium-ion batteries," Nature Nanotechnology, Sep. 7, 2015, pp. 1-7.
Zhu, Y. et al., "Red Phosphorus—Single-Walled Carbon Nanotube Composite as a Superior Anode for Sodium Ion Batteries," ACS Nano, vol. 9, No. 3, Mar. 4, 2015, pp. 3254-3264.

\* cited by examiner

*Primary Examiner* — Muhammad S Siddiquee
(74) *Attorney, Agent, or Firm* — Foley & Lardner LLP

(57) ABSTRACT

An electrochemical device includes an anode containing a phosphorus-carbon composite including a conductive carbon matrix and nano-sized phosphorus particles, wherein the nano-sized phosphorus particles are uniformly dispersed on the surface and/or pores of the carbon matrix.

6 Claims, 13 Drawing Sheets

Fig. 5A
Fig. 5B
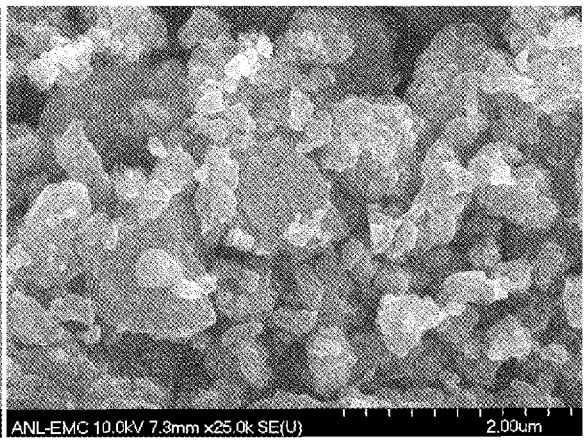
FIG. 6A
FIG. 6B
FIG. 6C
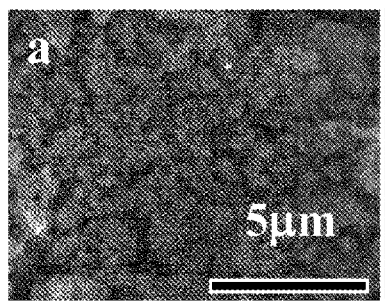
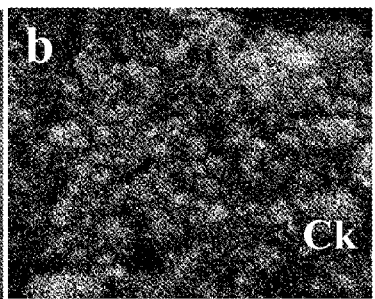
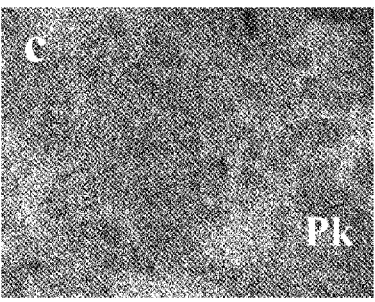
FIG. 7A
FIG. 7B
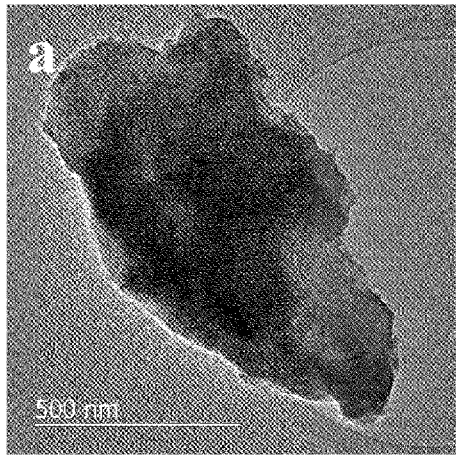
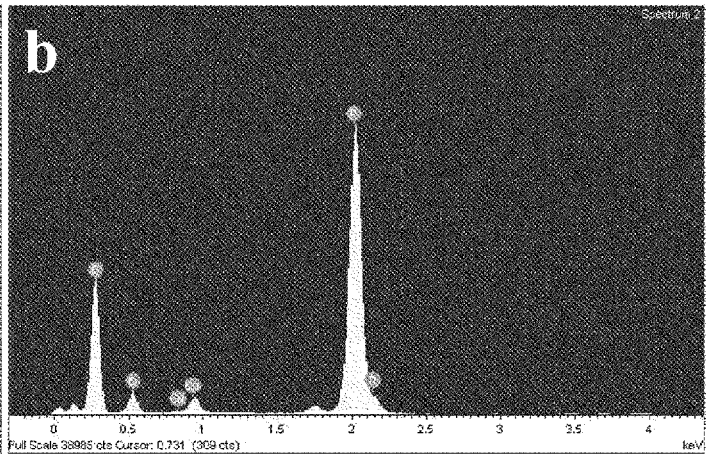

PHOSPHORUS-CARBON COMPOSITES AS BATTERY ANODE MATERIALS

CROSS-REFERENCE TO RELATED APPLICATIONS

This application is a continuation of U.S. patent application Ser. No. 15/006,456, filed on Jan. 26, 2016, the contents of which are incorporated herein by reference in their entirety.

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to electroactive materials and batteries containing such electroactive materials, and methods to prepare the electroactive materials and batteries containing the same. More specifically, the present technology is related to phosphorus-carbon composites as electroactive materials.

BACKGROUND

With the development of battery technology, lithium-ion batteries (LIBs) have served as the main power sources for portable electronic devices. Sodium-ion batteries (NIBs) are considered a potential alternative to LIBs due to the greater abundance and lower cost of sodium compared to lithium. Moreover, as lithium and sodium are both alkali metals, these two elements share similar physical and chemical properties. Much research has been conducted to directly replace lithium with sodium in already well-developed electrode materials of LIBs.

With regard to the area of cathodes, layered $NaNi_{1/3}Co_{1/3}Mn_{1/3}O_2$, spinel $NaMn_2O_4$, olive $NaFePO_4$, $NaFeSO_4F$ and their analogues have been already been reported and were found to have similar electrochemical behaviors relative to their lithium-based cathode material counterparts in terms of specific capacity, cycle life and rate capability, with the exception of lower working voltage.

However, in the area of anodes, it has been found that the commercially used graphite anode for LIBs can only store a small amount of sodium due to the larger radius of sodium when compared lithium, the insufficient interlayer distance of graphite, and the stretched C—C bonds induced by sodiation, which results in the Na-graphite intercalation compound becoming thermodynamically unstable. As a consequence, emphasis has been placed on the development of novel anode materials for NIBs, including non-graphitized carbon, metal oxide, and intermetallic metal anode materials. In spite of some promising results, the reversible capacities of such materials have not been very high (<1000 $mAh\ g^{-1}$).

SUMMARY

In one aspect, provided herein are electrochemical devices including an anode containing a phosphorus-carbon composite including a conductive carbon matrix and nano-sized phosphorus particles, wherein the nano-sized phosphorus particles include black phosphorus, red phosphorus, white phosphorus, violet phosphorus, or any combination thereof, the nano-sized phosphorus particles are uniformly dispersed on the surface and/or pores of the carbon matrix; and the carbon matrix includes one or more of graphite, graphene, expanded graphite, reduced graphene oxide, Black Pearls® 2000, Ketjenblack®, acetylene black, carbon black, a metal-organic framework, porous carbon, carbon spheres, and carbon aerogel; and one or more of single-walled carbon nanotubes, multi-walled carbon nanotubes, carbon nanofibers, carbon nanotube arrays, polypyrrole, and polyaniline. In some embodiments, the nano-sized phosphorus particles include a combination of red phosphorus and black phosphorus. In some embodiments, the electrochemical device is a sodium-ion battery. In some embodiments, the sodium-ion battery further includes a cathode, a separator and a non-aqueous electrolyte. In some embodiments, the cathode includes one or more of a cathode active material, a current collector, a conductive carbon material, and a binder. In some embodiments, the electrochemical device is a zinc-ion battery. In some embodiments, the electrochemical device is a calcium-ion battery. In some embodiments, the electrochemical device is a magnesium-ion battery. In some embodiments, the electrochemical device is an aluminum-ion battery.

In another aspect, provided herein are anodes including a phosphorus-carbon composite containing a conductive carbon matrix and nano-sized phosphorus particles, wherein the nano-sized phosphorus particles include black phosphorus, red phosphorus, white phosphorus, violet phosphorus, or any combination thereof, the nano-sized phosphorus particles are uniformly dispersed on the surface and/or pores of the carbon matrix; and the carbon matrix includes one or more of graphite, graphene, expanded graphite, reduced graphene oxide, Black Pearls® 2000, Ketjenblack®, acetylene black, carbon black, a metal-organic framework, porous carbon, carbon spheres, and carbon aerogel; and one or more of single-walled carbon nanotubes, multi-walled carbon nanotubes, carbon nanofibers, carbon nanotube arrays, polypyrrole, and polyaniline. In some embodiments, the anode further includes a current collector, a conductive agent, a binder, or any combination thereof.

In another aspect, provided herein are phosphorus-carbon composites including a conductive carbon matrix and nano-sized phosphorus particles, wherein the nano-sized phosphorus particles include black phosphorus, red phosphorus, white phosphorus, violet phosphorus, or any combination thereof, the nano-sized phosphorus particles are uniformly dispersed on the surface and/or pores of the carbon matrix; and the carbon matrix includes one or more of graphite, graphene, expanded graphite, reduced graphene oxide, Black Pearls® 2000, Ketjenblack®, acetylene black, carbon black, a metal-organic framework, porous carbon, carbon spheres, and carbon aerogel; and one or more of single-walled carbon nanotubes, multi-walled carbon nanotubes, carbon nanofibers, carbon nanotube arrays, polypyrrole, and polyaniline. In some embodiments, the nano-sized phosphorus particles include red phosphorus, black phosphorus, or a combination thereof. In some embodiments, the nano-sized phosphorus particles have a particle size of about 1 nm to about 200 nm. In some embodiments, the phosphorus-carbon composite has a carbon matrix content of about 1% to about 70% by weight of the composite. In some embodiments, the phosphorus-carbon composite has a phosphorus content of about 0.1% to about 99.9% by weight of the composite.

In another aspect, provided herein are methods to prepare a phosphorus-carbon composite described herein including ball milling a mixture comprising two or more precursors for the conductive carbon matrix; and phosphorus. In some embodiments, the two or more precursors include graphite, graphene, expanded graphite, reduced graphene oxide, Black Pearls® 2000, Ketjenblack®, acetylene black, carbon black, a metal-organic framework, porous carbon, carbon spheres, carbon aerogel, single-walled carbon nanotubes, multi-walled carbon nanotubes, carbon nanofibers, carbon nanotube arrays, polypyrrole, polyaniline, or any combination thereof. In some embodiments, the phosphorus is red phosphorus, black phosphorus, or a combination thereof.

In another aspect, provided herein are zinc-ion batteries including an anode including a phosphorus-carbon composite including a conductive carbon matrix and nano-sized phosphorus particles, wherein the nano-sized phosphorus particles are uniformly dispersed on the surface and/or pores of the carbon matrix; and the carbon matrix includes one or more of graphite, graphene, expanded graphite, reduced graphene oxide, acetylene black, carbon black, a metal-organic framework, porous carbon, carbon spheres, or carbon aerogel; and one or more of single-walled carbon nanotubes, multi-walled carbon nanotubes, carbon nanofibers, carbon nanotube arrays, polypyrrole, or polyaniline.

In another aspect, provided herein are calcium-ion batteries including an anode including a phosphorus-carbon composite including a conductive carbon matrix and nano-sized phosphorus particles, wherein the nano-sized phosphorus particles are uniformly dispersed on the surface and/or pores of the carbon matrix; and the carbon matrix includes one or more of graphite, graphene, expanded graphite, reduced graphene oxide, acetylene black, carbon black, a metal-organic framework, porous carbon, carbon spheres, or carbon aerogel; and one or more of single-walled carbon nanotubes, multi-walled carbon nanotubes, carbon nanofibers, carbon nanotube arrays, polypyrrole, or polyaniline.

In another aspect, provided herein are magnesium-ion batteries including an anode including a phosphorus-carbon composite including a conductive carbon matrix and nano-sized phosphorus particles, wherein the nano-sized phosphorus particles are uniformly dispersed on the surface and/or pores of the carbon matrix; and the carbon matrix includes one or more of graphite, graphene, expanded graphite, reduced graphene oxide, acetylene black, carbon black, a metal-organic framework, porous carbon, carbon spheres, or carbon aerogel; and one or more of single-walled carbon nanotubes, multi-walled carbon nanotubes, carbon nanofibers, carbon nanotube arrays, polypyrrole, or polyaniline.

In another aspect, provided herein are aluminum-ion batteries including an anode including a phosphorus-carbon composite including a conductive carbon matrix and nano-sized phosphorus particles, wherein the nano-sized phosphorus particles are uniformly dispersed on the surface and/or pores of the carbon matrix; and the carbon matrix includes one or more of graphite, graphene, expanded graphite, reduced graphene oxide, acetylene black, carbon black, a metal-organic framework, porous carbon, carbon spheres, or carbon aerogel; and one or more of single-walled carbon nanotubes, multi-walled carbon nanotubes, carbon nanofibers, carbon nanotube arrays, polypyrrole, or polyaniline.

BRIEF DESCRIPTION OF THE DRAWINGS

FIGS. 5A and 5B depict representative SEM images of bulk black phosphorus and of the black phosphorus-carbon composite of FIG. 3.

FIGS. 6A-6C depict (a) a representative SEM image and the corresponding elemental mapping of (b) carbon and (c) phosphorus in the black phosphorus-carbon composite of FIG. 3.

FIGS. 7A and 7B depict a representative low magnification TEM image and the corresponding EDX spectra of the black phosphorus-carbon composite of FIG. 3.

DETAILED DESCRIPTION

Figure 1:
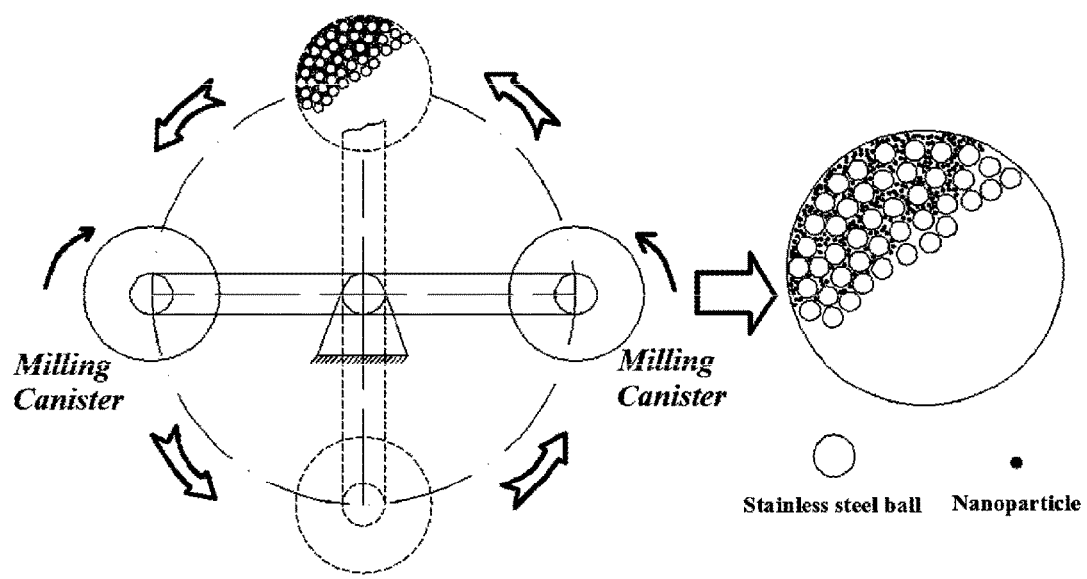
FIG. 1 depicts a representation of high energy ball milling process.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In one aspect, phosphorus-carbon composites are provide that include a conductive carbon matrix and nano-sized phosphorus particles, where the nano-sized phosphorus particles are uniformly dispersed on the surface and/or pores of the carbon matrix. Without being bound to theory, the nano-sized particles of phosphorus produced during a high energy ball milling process may shorten the diffusion path of cations and accommodate the volume changes during repeated charge/discharge.

The conductive carbon matrix may include, but is not limited to, graphite, graphene, expanded graphite, reduced graphene oxide, Black Pearls® 2000, Ketjenblack®, acetylene black, carbon black, metal-organic framework (e.g., a porous, ordered organic-inorganic composite material), porous carbon, carbon spheres, carbon aerogel, single-walled carbon nanotubes, multi-walled carbon nanotubes, carbon nanofibers, carbon nanotube arrays, polypyrrole, polyaniline, and mixtures of any two or more such materials. Black Pearls® 2000 and Ketjenblack® are commercially available forms of carbon black. In some embodiments, the conductive carbon matrix includes a mixture of any two or more of graphite, graphene, expanded graphite, reduced graphene oxide, Black Pearls® 2000, Ketjenblack®, acetylene black, carbon black, metal-organic framework (e.g., a porous, ordered organic-inorganic composite material), porous carbon, carbon spheres, carbon aerogel, single-walled carbon nanotubes, multi-walled carbon nanotubes, carbon nanofibers, carbon nanotube arrays, polypyrrole, and polyaniline. In some embodiments, the conductive carbon matrix includes one or more of graphite, graphene, expanded graphite, reduced graphene oxide, Black Pearls® 2000, Ketjenblack®, acetylene black, carbon black, metal-organic framework (e.g., a porous, ordered organic-inorganic composite material), porous carbon, carbon spheres, and carbon aerogel. In further embodiments, the conductive carbon matrix further includes one or more of single-walled carbon nanotubes, multi-walled carbon nanotubes, carbon nanofibers, carbon nanotube arrays, polypyrrole, and polyaniline.

The conductive carbon matrix may have a high specific surface area to support the nano-sized phosphorus particles. Without being bound to theory, the high surface area of the conductive carbon matrix enables a uniform dispersion of phosphorus nano-sized particles in the phosphorus-carbon composite, which may prevent the aggregation of phosphorus particles during charge/discharge cycling. The high specific surface area may be about 100 to about 2600 $m^2\ g^{-1}$. This includes a high specific surface area of about 200 to about 2600 $m^2\ g^{-1}$, about 400 to about 2600 $m^2\ g^{-1}$, about 600 to about 2600 $m^2\ g^{-1}$, about 800 to about 2600 $m^2\ g^{-1}$, about 1000 to about 2600 $m^2\ g^{-1}$, about 1200 to about 2600 $m^2\ g^{-1}$, about 1400 to about 2600 $m^2\ g^{-1}$, about 1600 to about 2600 $m^2\ g^{-1}$, about 1800 to about 2600 $m^2\ g^{-1}$, about 2000 to about 2600 $m^2\ g^{-1}$, or about 2200 to about 2600 $m^2\ g^{-1}$. In some embodiments, the high specific surface area is about 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, or 2600 $m^2\ g^{-1}$.

Figure 2:
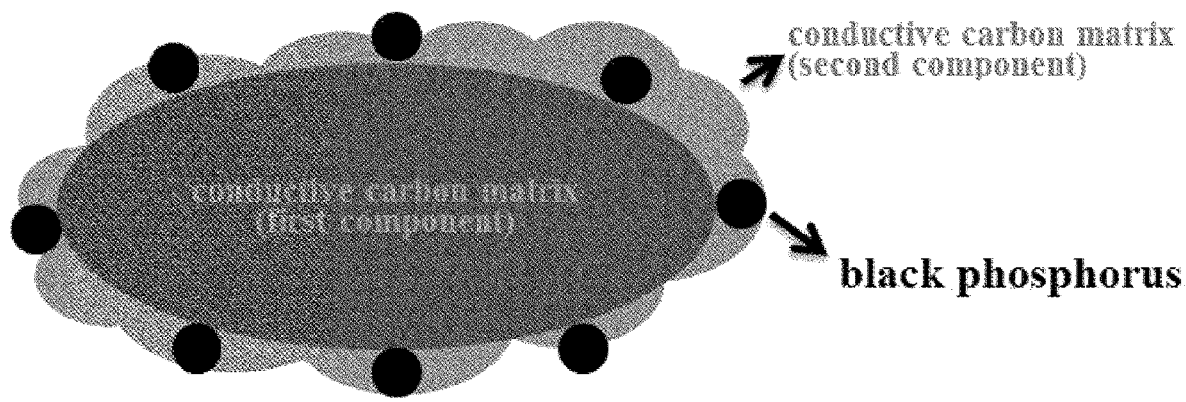
FIG. 2 depicts a representative general structure of the phosphorus-carbon composite disclosed herein.

The conductive carbon matrix may be a dual-component conductive carbon matrix. Dual-component conductive carbon matrices include a first component that is graphite, graphene, expanded graphite, reduced graphene oxide, Black Pearls® 2000, Ketjenblack®, acetylene black, carbon black, metal-organic framework, porous carbon, carbon spheres, carbon aerogel, or a mixture of any two or more thereof, and a second component that is single-walled carbon nanotubes, multi-walled carbon nanotubes, carbon nanofibers, carbon nanotube arrays, polypyrrole, polyaniline, or a mixture of any two or more thereof. The second component has been found to increase the mechanical strength and/or the electronic conductivity of the phosphorus-carbon composite relative to a phosphorus-carbon composite containing a carbon matrix with only the first component. In some embodiments, the phosphorus-carbon composite has the structure depicted in FIG. 2.

The first component may be present in an amount of about 1% to about 80% by weight of the composite. This includes an amount of about 5% to about 80%, about 10% to about 80%, about 20% to about 80%, about 30% to about 80%, about 40% to about 80%, about 50% to about 80%, about 60% to about 80%, or about 70% to about 80% by weight of the composite. In some embodiments, the first component is present in an amount of about 1% to about 70% by weight of the composite. This includes an amount of about 5% to about 70%, about 10% to about 70%, about 20% to about 70%, about 30% to about 70%, about 40% to about 70%, about 50% to about 70%, or about 60% to about 70% by weight of the composite. In some embodiments, the first component is present in an amount of about 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, or 80%, including increments therein, by weight of the composite.

The first component may have a specific surface area of about 100 to about 2600 $m^2\ g^{-1}$. This includes a specific surface area of about 200 to about 2600 $m^2\ g^{-1}$, about 400 to about 2600 $m^2\ g^{-1}$, about 600 to about 2600 $m^2\ g^{-1}$, about 800 to about 2600 $m^2\ g^{-1}$, about 1000 to about 2600 $m^2\ g^{-1}$, about 1200 to about 2600 $m^2\ g^{-1}$, about 1400 to about 2600 $m^2\ g^{-1}$, about 1600 to about 2600 $m^2\ g^{-1}$, about 1800 to about 2600 $m^2\ g^{-1}$, about 2000 to about 2600 $m^2\ g^{-1}$, or about 2200 to about 2600 $m^2\ g^{-1}$. In some embodiments, the specific surface area is about 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, or 2600 $m^2\ g^{-1}$.

The second component may be present in an amount of about 0.5% to about 30% by weight of the composite. This includes an amount of about 1% to about 30%, 5% to about 30%, about 10% to about 30%, about 15% to about 30%, about 20% to about 30%, or about 25% to about 30% by weight of the composite. In some embodiments, the second component is present in an amount of about 0.5% to about 20% by weight of the composite. This includes an amount of about 1% to about 20%, 5% to about 20%, about 10% to about 20%, or about 15% to about 20% by weight of the composite. In some embodiments, the second component is present in an amount of about 0.1, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30%, including increments therein, by weight of the composite.

The nano-sized phosphorus particles may include red phosphorus, black phosphorus, white phosphorus, violet phosphorus, or a combination thereof.

The nano-sized phosphorus particles may have a particle size of about 1 nm to about 200 nm. This includes nano-sized phosphorus particles having a particle size of about 5 nm to about 200 nm, about 10 nm to about 200 nm, about 20 nm to about 200 nm, about 30 nm to about 200 nm, about 40 nm to about 200 nm, about 50 nm to about 200 nm, about 60 nm to about 200 nm, about 70 nm to about 200 nm, about 80 nm to about 200 nm, about 90 nm to about 200 nm, or about 100 nm to about 200 nm. In some embodiments, the nano-sized phosphorus particles have a particle size of about 1 nm to about 150 nm. This includes nano-sized phosphorus particles having a particle size of about 5 nm to about 150 nm, about 10 nm to about 150 nm, about 20 nm to about 150 nm, about 30 nm to about 150 nm, about 40 nm to about 150 nm, about 50 nm to about 150 nm, about 60 nm to about 150 nm, about 70 nm to about 150 nm, about 80 nm to about 150 nm, about 90 nm to about 150 nm, or about 100 nm to about 150 nm. In some embodiments, the nano-sized phosphorus particles have a particle size of about 1 nm to about 100 nm. This includes nano-sized phosphorus particles having a particle size of about 5 nm to about 100 nm, about 10 nm to about 100 nm, about 20 nm to about 100 nm, about 30 nm to about 100 nm, about 40 nm to about 100 nm, about 50 nm to about 100 nm, about 60 nm to about 100 nm, about 70 nm to about 100 nm, about 80 nm to about 100 nm, or about 90 nm to about 100 nm. In some embodiments, the nano-sized phosphorus particles have a particle size of about 1 nm to about 50 nm. This includes nano-sized phosphorus particles having a particle size of about 5 nm to about 50 nm, about 10 nm to about 50 nm, about 20 nm to about 50 nm, about 30 nm to about 50 nm, or about 40 nm to about 50 nm. In some embodiments, the nano-sized phosphorus particles have a particle size of about 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 nm, including increments therein.

The phosphorus-carbon composite may have a carbon matrix content of about 1% to about 70% by weight of the composite. This includes a carbon matrix content of about 5% to about 70%, about 10% to about 70%, about 15% to about 70%, about 20% to about 70%, about 25% to about 70%, about 30% to about 70%, about 35% to about 70%, about 40% to about 70%, about 45% to about 70%, or about 50% to about 70% by weight of the composite. In some embodiments, the phosphorus-carbon composite has a carbon matrix content of about 1% to about 60% by weight of the composite. This includes a carbon matrix content of about 5% to about 60%, about 10% to about 60%, about 15% to about 60%, about 20% to about 60%, about 25% to about 60%, about 30% to about 60%, about 35% to about 60%, about 40% to about 60%, about 45% to about 60%, or about 50% to about 60% by weight of the composite. In some embodiments, the phosphorus-carbon composite has a carbon matrix content of about 1% to about 50% by weight of the composite. This includes a carbon matrix content of about 5% to about 50%, about 10% to about 50%, about 15% to about 50%, about 20% to about 50%, about 25% to about 50%, about 30% to about 50%, about 35% to about 50%, about 40% to about 50%, or about 45% to about 50% by weight of the composite. In some embodiments, the phosphorus-carbon composite has a carbon matrix content of about 1, 2, 3, 4, 5, 6, 7, 8, 9, 10, 11, 12, 13, 14, 15, 16, 17, 18, 19, 20, 25, 30, 35, 40, 45, 50, 55, 60, 65, or 70%, including increments therein, by weight of the composite.

The phosphorus-carbon composite may have a phosphorus content of about 0.1% to about 99.9% by weight of the composite. This includes a phosphorus content of about 0.5% to about 99.9%, about 1% to about 99.9%, about 5% to about 99.9%, about 10% to about 99.9%, about 20% to about 99.9%, about 30% to about 99.9%, about 40% to about 99.9%, about 50% to about 99.9%, about 60% to about 99.9%, about 70% to about 99.9%, about 80% to about 99.9%, or about 90% to about 99.9% by weight of the composite. In some embodiments, the phosphorus-carbon composite has a phosphorus content of about 0.1% to about 99% by weight of the composite. This includes a phosphorus content of about 0.5% to about 99%, about 1% to about 99%, about 5% to about 99%, about 10% to about 99%, about 20% to about 99%, about 30% to about 99%, about 40% to about 99%, about 50% to about 99%, about 60% to about 99%, about 70% to about 99%, about 80% to about 99%, or about 90% to about 99% by weight of the composite. In some embodiments, the phosphorus-carbon composite has a phosphorus content of about 0.1% to about 90% by weight of the composite. This includes a phosphorus content of about 0.5% to about 90%, about 1% to about 90%, about 5% to about 90%, about 10% to about 90%, about 20% to about 90%, about 30% to about 90%, about 40% to about 90%, about 50% to about 90%, about 60% to about 90%, about 70% to about 90%, or about 80% to about 90% by weight of the composite. In some embodiments, the phosphorus-carbon composite has a phosphorus content of about 0.1% to about 80% by weight of the composite. This includes a phosphorus content of about 0.5% to about 80%, about 1% to about 80%, about 5% to about 80%, about 10% to about 80%, about 20% to about 80%, about 30% to about 80%, about 40% to about 80%, about 50% to about 80%, about 60% to about 80%, or about 70% to about 80% by weight of the composite. In some embodiments, the phosphorus-carbon composite has a phosphorus content of about 0.1, 0.5, 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 99, or 99.9%, including increments therein, by weight of the composite.

In another aspect, provided herein are methods to prepare a phosphorus-carbon composite disclosed herein.

The method may include ball milling a mixture containing one or more precursors for the conductive carbon matrix; and phosphorus. In some embodiments, the ball milling is high energy ball milling, as depicted in FIG. 1. The one or more precursors for the conductive carbon matrix may include graphite, graphene, expanded graphite, reduced graphene oxide, Black Pearls® 2000, Ketjenblack®, acetylene black, carbon black, a metal-organic framework, porous carbon, carbon spheres, carbon aerogel, single-walled carbon nanotubes, multi-walled carbon nanotubes, carbon nanofibers, carbon nanotube arrays, polypyrrole, polyaniline, or any combination thereof. The phosphorus may be red phosphorus, black phosphorus, or a combination thereof.

The method may include ball milling a mixture containing a first precursor and a second precursor for the conductive carbon matrix; and phosphorus. The first precursor may include graphite, graphene, expanded graphite, reduced graphene oxide, Black Pearls® 2000, Ketjenblack®, acetylene black, carbon black, a metal-organic framework, porous carbon, carbon spheres, carbon aerogel, or any combination thereof. The second precursor may include single-walled carbon nanotubes, multi-walled carbon nanotubes, carbon nanofibers, carbon nanotube arrays, polypyrrole, polyaniline, or any combination thereof. The phosphorus may be red phosphorus, black phosphorus, or a combination thereof.

The ball milling may be performed at a rotation speed of about 300 to about 1500 rpm. This includes a rotation speed of about 400 to about 1500 rpm, about 500 to about 1500 rpm, about 600 to about 1500 rpm, about 700 to about 1500 rpm, about 800 to about 1500 rpm, about 900 to about 1500 rpm, about 1000 to about 1500 rpm, about 1100 to about 1500 rpm, about 1200 to about 1500 rpm, about 1300 to about 1500 rpm, or about 1400 to about 1500 rpm. In some embodiments, the rotation speed is about 300, 400, 500, 600, 700, 800, 900, 1000, 1100, 1200, 1300, 1400, or 1500, including increments therein, rpm.

The ball milling may be performed for a time period of about 1 to about 40 hours. This includes a time period of about 2 to about 40 hours, about 3 to about 40 hours, about 4 to about 40 hours, about 5 to about 40 hours, about 6 to about 40 hours, about 7 to about 40 hours, about 8 to about 40 hours, about 9 to about 40 hours, about 10 to about 40 hours, about 11 to about 40 hours, about 12 to about 40 hours, about 15 to about 40 hours, about 20 to about 40 hours, about 25 to about 40 hours, about 30 to about 40 hours, or about 35 to about 40 hours. In some embodiments, the ball milling is performed for a time period of about 1 to about 15 hours. This includes a time period of about 2 to about 15 hours, about 3 to about 15 hours, about 4 to about 15 hours, about 5 to about 15 hours, about 6 to about 15 hours, about 7 to about 15 hours, about 8 to about 15 hours, about 9 to about 15 hours, or about 10 to about 15 hours.

The ball milling may be conducted in a variety of container. An illustrative container is an agate container having agate balls, or a zirconium container containing zirconium balls, under inert atmosphere (e.g., argon gas), and at a rotation speed of about 300-1500 rpm for about 1 to 20 hours.

In another aspect, disclosed herein are electroactive materials including a phosphorus-carbon composite as described.

In another aspect, disclosed herein are anodes including a phosphorus-carbon composite disclosed herein. In some embodiments, the anode includes a phosphorus-carbon composite including a conductive carbon matrix and nano-sized phosphorus particles, wherein the nano-sized phosphorus particles are uniformly dispersed on the surface and/or pores of the carbon matrix.

The anode may further include one or more of a current collector, a conductive carbon material, and a binder.

In another aspect, disclosed herein are electrochemical devices including an anode containing a phosphorus-carbon composite disclosed herein. In some embodiments, the electrochemical devices are sodium-ion batteries. In further embodiments, the electrochemical devices are room-temperature sodium-ion batteries. In some embodiments, the electrochemical devices are primary batteries, secondary batteries, or capacitors. In some embodiments, the electrochemical devices are secondary sodium-ion batteries.

In some embodiments, the electrochemical devices are zinc-ion batteries. In some embodiments, the electrochemical devices are calcium-ion batteries. In some embodiments, the electrochemical devices are magnesium-ion batteries. In some embodiments, the electrochemical devices are aluminum-ion batteries.

In some embodiments, the electrochemical device includes an anode containing a phosphorus-carbon composite including a conductive carbon matrix and nano-sized phosphorus particles, wherein the nano-sized phosphorus particles are uniformly dispersed on the surface and/or pores of the carbon matrix.

The electrochemical device may further include a cathode and a separator. In some embodiments, the electrochemical device further includes a cathode, a separator, and an electrolyte. In some embodiments, the electrochemical device further includes a cathode, a separator, and a non-aqueous electrolyte.

The cathode may include one or more of a cathode active material, a current collector, a conductive carbon material, and a binder. The active cathode material may include $Na_nCoO_2$, $Na_nMnO_2$, $Na_nNiO_2$, $Na_nCo_{2/3}Mn_{1/3}O_2$, $Na_n\text{-}Ni_xZn_yMn_zO_2$ (x+y+z=1), $NaFePO_4$, $Na_xFe_{0.5}Mn_{0.5}PO_4$, $Na_3V_2(P_4)_3$, $Na_2FePO_4F$, or $NaFeSO_4F$, or any combination thereof, wherein 0<n<1. The cathode may be an air cathode.

Illustrative conductive carbon materials include, but are not limited to, microporous carbon, mesoporous carbon, mesoporous microbeads, graphite, expandable graphite, carbon black, or carbon nanotubes, or any combination thereof. Commercial examples of carbon black include, but are not limited to, Super-P®, Black Pearls® 2000, Denka Black®, Vulcan® XC72R, and Ketjenblack®.

The current collector may be prepared from a wide variety of materials. For example, illustrative current collectors include, but are not limited to, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen. In some embodiments, the graphene-wrapped $Li_2S$ nanoparticles disclosed herein and one or more of a conductive carbon material and a binder are contacted with the current collector by casting, pressing, or rolling the mixture thereto.

When used, the binder may be present in the electrode in an amount of from about 0.1 wt. % to about 99 wt. %. In some embodiments, the binder is present in the electrode in an amount of from about 2 wt. % to about 20 wt. %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers.

Illustrative separators include, but are not limited to, Celgard® 2325, Celgard® 2400, Celgard® 3501, and a glass fiber separator.

The electrolyte may include a sodium salt and a solvent. The sodium salt may be $NaClO_4$, $NaPF_6$, $NaAsF_6$, $NaBF_4$, $NaCF_3SO_3$ or $NaN(SO_2CF_3)$, or any combination thereof. The salt may be present in the electrolyte at a concentration of about 0.01 M to about 3.0 M. This includes a concentration of about 0.01 M to about 2.5 M, about 0.01 M to about 2.0 M, about 0.01 M to about 2.0 M, about 0.01 M to about 1.5 M, about 0.01 M to about 1.0 M, about 0.01 M to about 0.5 M, or about 0.01 M to about 0.1 M. In some embodiments, the salt is present in the electrolyte at a concentration of about 0.5 M to about 3.0 M. This includes a concentration of about 0.5 M to about 2.0 M, about 0.5 M to about 1.5 M, about 1.0 M to about 3.0 M, or about 1.0 M to about 2.0 M. In some embodiments, the salt is present in the electrolyte at a concentration of about 0.01, 0.05, 0.1, 0.5, 1.0, 1.5, 2.0, 2.5, or 3.0 M, including increments therein. The organic solvent may be at least one of ethylene carbonate, propylene carbonate, diethyl carbonate, dimethyl carbonate, ethyl methyl carbonate, tetraethylene glycol, dimethylsulfolane, 1,2-dimethoxyethane, and 1,2-diethoxyethane. In some embodiments, the electrolyte further includes an electrolyte additive. Illustrative electrolyte additives include, but are not limited to, vinylene carbonate, fluorinated ethylene carbonated, cyclic disulfonic ester methylene methanedisulfonate (MMDS), lithium bis(oxolate)borate, ethylene sulfite, ethylene sulfate, trimethylene sulfite, 1,3-butylene glycol sulfite, tris(trimethylsilyl) phosphate (TMSP) and tris(trimethylsilyl)borate (TMSB). The electrolyte additive may be present in the electrolyte in an amount of about 1% to about 10% by weight or by volume. This includes an amount of about 1% to about 8% by weight or by volume, about 1% to about 6% by weight or by volume, about 1% to about 4% by weight or by volume, or about 1% to about 3% by weight or by volume. In some embodiments, the electrolyte additive is present in the electrolyte in an amount of about 1, 2, 3, 4, 5, 6, 7, 8, 9, or 10% by weight or by volume.

The present invention, thus generally described, will be understood more readily by reference to the following examples, which are provided by way of illustration and are not intended to be limiting of the present invention.

EXAMPLES

Example 1. Preparation of Black Phosphorus-Carbon Composite

Black phosphorus, Ketjenblack® and multi-walled carbon nanotubes (MWCNTs) were mixed in weight ratio of 7/2.5/0.5 in a glove box (argon filled) and then transferred to a high energy ball milling machine and ball milled at 1425 rpm for 700 minutes. The weight ratio of the balls and the mixture was maintained in a ratio of 10.

Example 2. X-Ray Diffraction Analysis of Black Phosphorus-Carbon Composite

Figure 3:
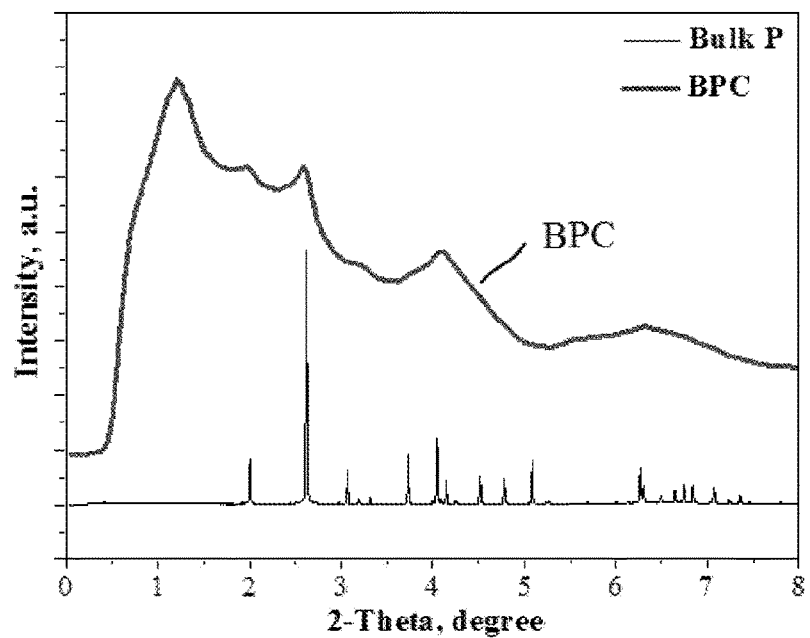
FIG. 3 depicts a representative x-ray diffraction pattern of bulk black phosphorus and a non-limiting example of black phosphorus-carbon composite (BPC).

The phosphorus-carbon composite of Example 1 was characterized by x-ray diffraction (XRD) (FIG. 3). Contrary to the XRD patterns of previously reported phosphorus-carbon composites prepared by high energy ball milling in which the peaks of phosphorus have completely disappeared, the peaks belonging to black phosphorus in this present Example were still observed, indicating the crystalline structure of black phosphorus was not completely destroyed during the preparation process. However, the peaks became very broad, indicating that the particle size of black phosphorus may be very small.

Figure 4:
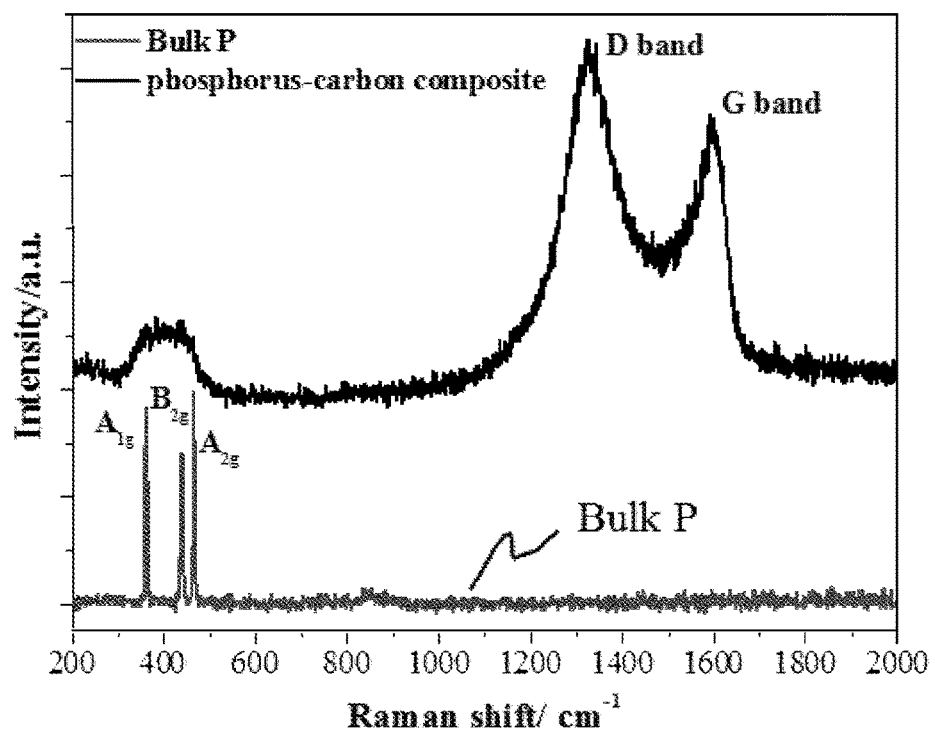
FIG. 4 depicts representative Raman spectra of bulk black phosphorus and of the black phosphorus-carbon composite of FIG. 3.

Example 3. Comparison of Raman Spectra of Black Phosphorus and Black Phosphorus-Carbon Composite The structures of bulk black phosphorus and phosphorus-carbon composite of Example 1 were further elucidated by their Raman spectra (FIG. 4). Bulk black phosphorus presented three sharp peaks at 362.5 $cm^{-1}$, 439.8 $cm^{-1}$ and 467.1 $cm^{-1}$, which are due to vibrations of the crystalline lattice of the black phosphorus, matching the Raman shifts attributed to the $A_{1g}$, $B_{2g}$ and $A_{2g}$ phonon modes. However, after high energy ball milling process, these sharp peaks no longer existed in the Raman spectrum of phosphorus-carbon composite. A weak and broad peak appeared instead, appearing to indicate that the black phosphorus may be transformed to amorphous phosphorus after ball milling. The spectrum also showed two large broad peaks at 1323 $cm^{-1}$ (D band) and 1604 $cm^{-1}$ (G band). The D band corresponded to the defects and disorder in the structure of the carbon materials in the phosphorus-carbon composite due to intervalley scattering, while the G band was related to the $E_{2g}$ vibration of $sp^2$ carbon atoms in the carbon materials. The intensity ratio between D band and G band represented the degree of graphitization.

Example 4. Microstructure and Morphology Characterization of Black Phosphorus-Carbon Composite The microstructure and morphology of the phosphorus-carbon composite of Example 1 were examined with scanning electron microscopy (SEM) and transmission electron microscopy (TEM). The elemental distribution for phosphorus and carbon was characterized by EDX elemental mapping. The composition of the phosphorus-carbon composite was also determined with an energy dispersive spectrometer (EDS) attached to the TEM instrument.

The microstructures of bulk black phosphorus and phosphorus-carbon composite as observed using SEM are shown in FIGS. 5a and 5b, respectively. As shown, the particle size of bulk black phosphorus is about hundreds of micrometers. After ultrahigh ball milling, in the case of the phosphorus-carbon composite, these huge black phosphorus particles no longer exist. Instead, these particles are mixed with carbon materials and have a particle size less than 1 μm as observed in FIG. 5b.

In order to ascertain the distribution of phosphorus and carbon in the phosphorus-carbon composite, SEM elemental mapping was conducted (FIGS. 6a-6c). As shown, no obvious aggregation of phosphorus was observed, demonstrating that the relatively larger particles with a size of about 1 μm in FIG. 5b and FIG. 6a were not chunk phosphorus. In addition, carbon (FIG. 6b) and phosphorus (FIG. 6c) were found all over the sample in FIG. 6a, indicating a uniform mixing of phosphorus and carbon in the composite, likely ensuring a high electronic conductivity of the composite.

A low magnification TEM image (FIG. 7a) of the phosphorus-carbon composite shows that particle size is about 1 μm and that the particle surface is fairly rough, which is strongly different to bulk phosphorus. The elemental analysis of the phosphorus-carbon composite carried out by EDS is shown in FIG. 7b, demonstrating the existence of both carbon and phosphorus. Indications of copper and oxygen may come from the copper grid sample holder.

Figure 8:
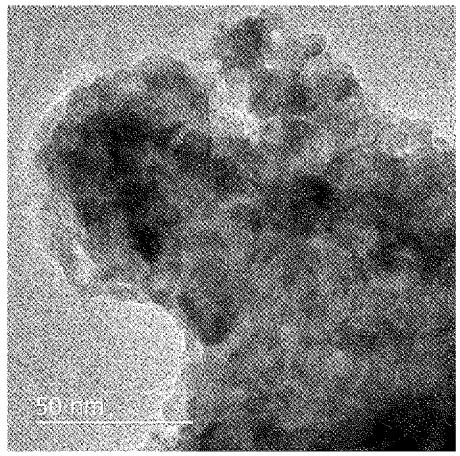
FIG. 8 depicts a representative high magnification TEM image of the black phosphorus-carbon composite of FIG. 3.
Figure 9:
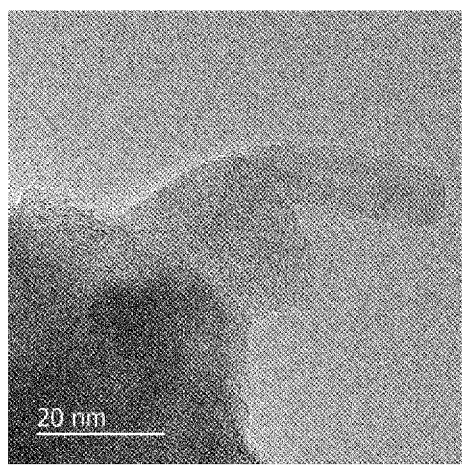
FIG. 9 depicts a representative high resolution TEM image of the black phosphorus-carbon composite of FIG. 3.

A high magnification TEM image of the phosphorus-carbon composite (FIG. 8), shows crystalline lattices of black phosphorus within an amorphous structure of conductive carbon matrix, indicating that the size of phosphorus domains in the composite is in the range of 10-200 nm. FIG. 9 depicts a high resolution TEM image of the phosphorus-carbon composite, which shows that crystalline fringes of MWCNTs are distributed along the edge of the black phosphorus/conductive carbon matrix to form a dual conductive network.

Example 5. Exemplary Battery Using Black Phosphorus-Carbon Composite

The phosphorus-carbon composite of Example 1 was mixed with 15 wt. % of Super-P® and 15 wt. % of sodium cellulose (2 wt. % in water) binder. The well-mixed slurry was then cast onto a sheet of copper foil by a doctor blade on an automatic film coater. The film was dried in a vacuum oven at 80° C. for 12 h and then transferred to a glove box filled with argon, before being punched out as circular disks, 14 mm in diameter. Electrolyte consisted of 1.0 M $NaPF_6$ salt in a propylene carbonate (PC) solution with 2 vol. % of fluorinated ethylene carbonate as an additive. A CR2032 coin cell was then assembled using the prepared electrode disk, the prepared electrolyte, a lithium foil counter electrode, and a glass fiber separator. Cell assembly was conducted in a glove box filled with argon.

Figure 10:
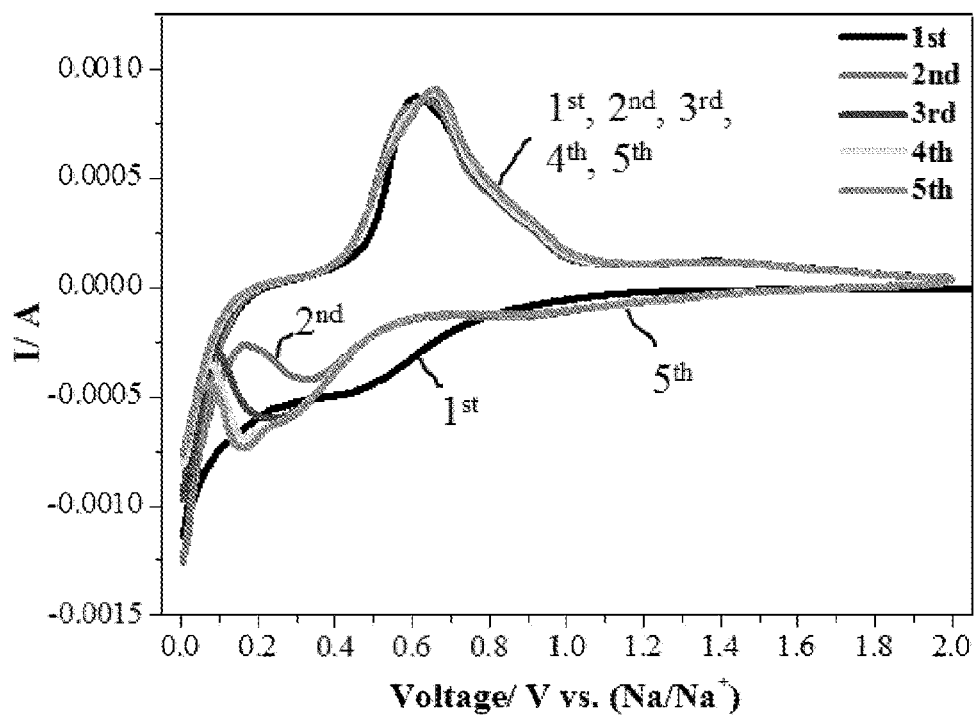
FIG. 10 depicts representative cyclic voltammograms of a non-limiting example of an electrochemical cell containing a black phosphorus-carbon composite anode.

Example 6. Electrochemical Properties of an Exemplary Battery Using Black Phosphorus-Carbon Composite In order to examine the sodiation/de-sodiation process of the phosphorus-carbon composite anode material, cyclic voltammetry (CV) was performed at a scan rate of 0.1 mV $s^{-1}$ within a voltage range of 0.01 to 2.0 V with the electrochemical cell of Example 5. FIG. 10 illustrates CV data for the first five cycles for the phosphorus-carbon composite anode material of Example 5. A weak, broad peak around 1.0 V was observed in the first cathodic scan, and is attributed to the reduction of electrolytes to form the solid electrolyte interphase layer. In subsequent scans, a weak, broad peak at about 0.95 V was continuously observed, which may be attributed to the initial sodiation of black phosphorus. When the potential was further scanned from 0.8 to 0.01 V, a major cathodic peak appeared at about 0.45 V, which may correspond to sodium ion insertion and formation of $Na_xP$. This peak shifted to a lower potential and stabilized after 4 cycles, which may be ascribed to an activation process. Three peaks centered at 0.59 V, 0.90 V, and 1.43 V were observed during the first anodic scan and were also detected in subsequent scans. These peaks possibly corresponded to a step-wise sodium ion extraction from the fully charged $Na_3P$ phase to form the $Na_2P$, NaP and $NaP_7$ intermediates, respectively. Most of the peaks completely overlap after four cycles, indicating good cycle stability of phosphorus-carbon composite anode material.

Figure 11:
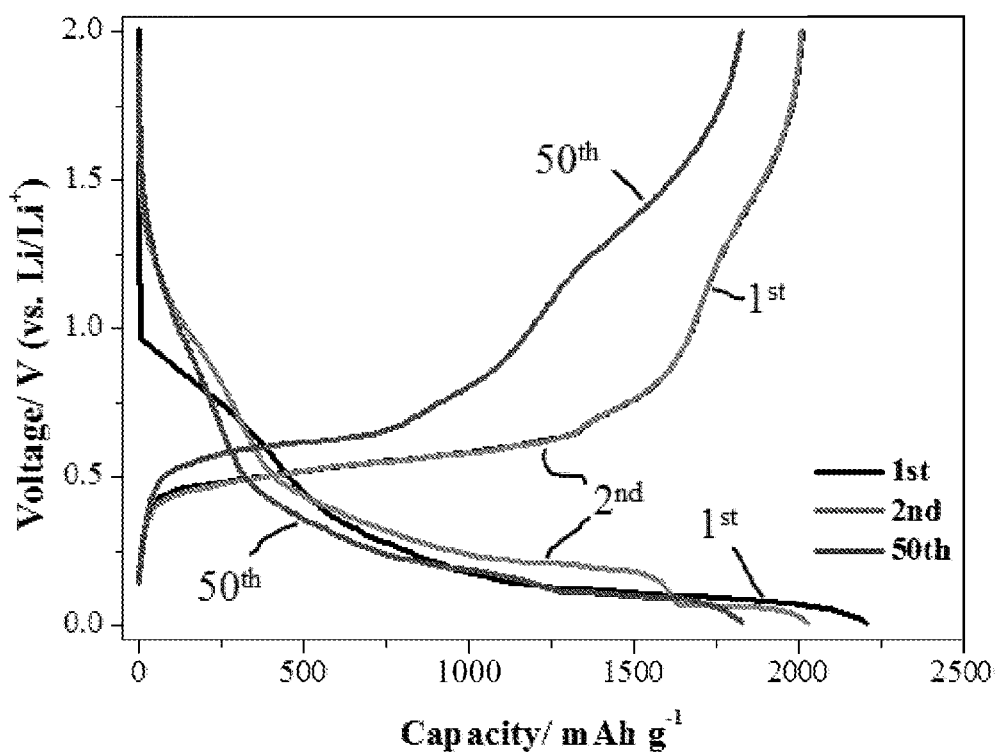
FIG. 11 depicts representative charge/discharge curves of the electrochemical cell of FIG. 10.
Figure 12:
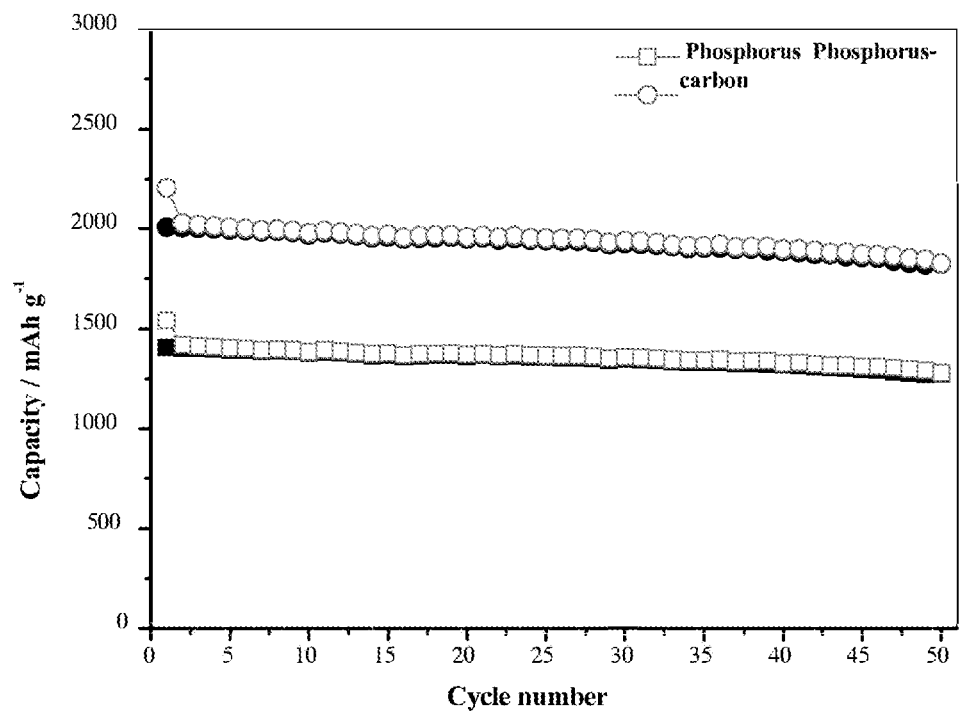
FIG. 12 depicts representative cycle performance of the electrochemical cell of FIG. 10.
Figure 13:
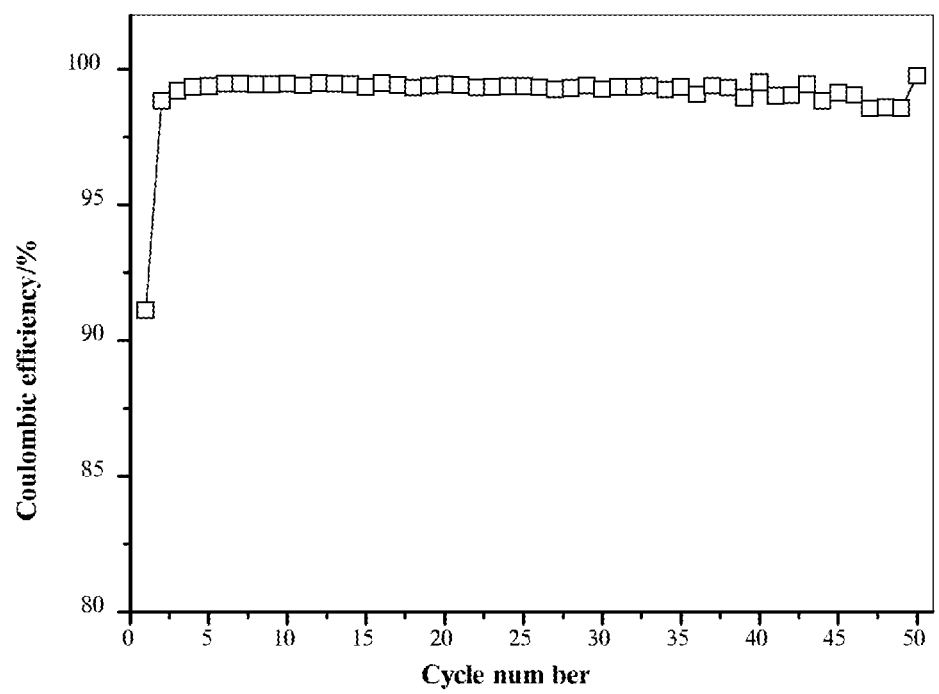
FIG. 13 depicts representative coulombic efficiency of the electrochemical cell of FIG. 10.
Figure 14:
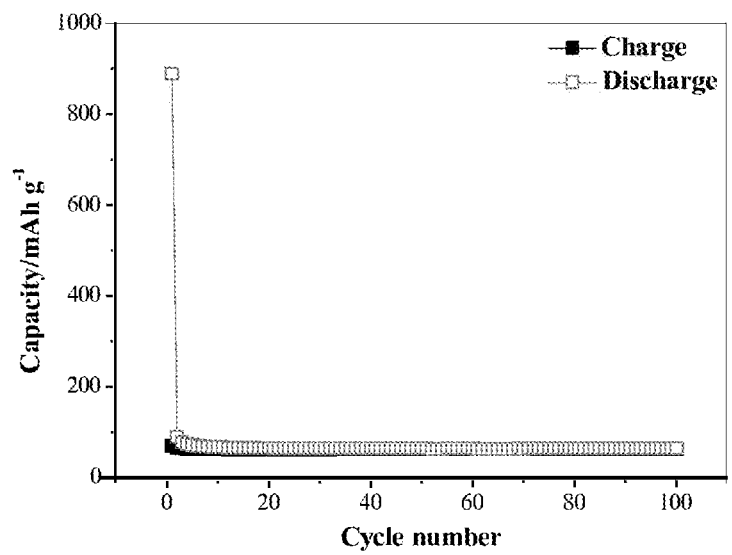
FIG. 14 depicts representative cycle performance of a comparative electrochemical cell containing a Ketjenblack®-MWCNT composite at 0.4 A g$^{-1}$ in 1 M NaPF$_6$/PC with 2 vol. % fluorinated ethylene carbonate additive.

The charge/discharge profiles of the phosphorus-carbon composite anode at 0.4 A $g^{-1}$ are shown in FIG. 11. With regard to the discharge profiles, with the exception of the first sodiation curve which is different from others due to the SEI formation, the general sodiation curves consisted of a sloping region from 1.0 to 0.5 V (vs. $Na/Na^+$) followed by an inclined plateau from 0.5 to 0.10 V (vs. $Na/Na^+$) and another sloping region from 0.10 to 0.01 V (vs. $Na/Na^+$). With regard to the charge profiles, the de-sodiation curves comprised a sloping region from 0.01 to 0.4 V (vs. $Na/Na^+$) and an inclined plateau from 0.4 to 0.8 V (vs. $Na/Na^+$) followed by a sloping region up to 2 V (vs. $Na/Na^+$). These observations are consistent with the CV results in FIG. 10. The initial discharge capacity of the phosphorus-carbon composite was measured at 2206.74 mAh $g^{-1}$ with a high initial coulombic efficiency of up to 91.13%, corresponding to 85% phosphorus utilization compared to the theoretical capacity of phosphorus. Upon continuous charge/discharge, as shown in FIG. 12, the phosphorus-carbon composite anode maintained very stable capacities in 50 cycles, indicating excellent cycle stability. The discharge capacity after 50 cycles was measured at 1831.2 mAh $g^{-1}$, corresponding to capacity retention as high as 83%. As shown in FIG. 13, there was a high coulombic efficiency of up to 100% in 50 cycles, indicating a complete sodiation/de-sodiation process of phosphorus-carbon composite. In contrast, the capacities contributed by a Ketjenblack®-MWCNT composite (without black phosphorus-carbon) were negligible considering their much lower capacities (~66 mAh $g^{-1}$) as an anode in a comparative electrochemical cell (FIG. 14). Unless otherwise specified, the capacities as described herein are calculated based on the active materials of phosphorus in the phosphorus-carbon composite. Even considering the content of phosphorus, the phosphorus-carbon composite could also maintain a high overall capacity above 1000 mAh g in 50 cycles.

Figure 15:
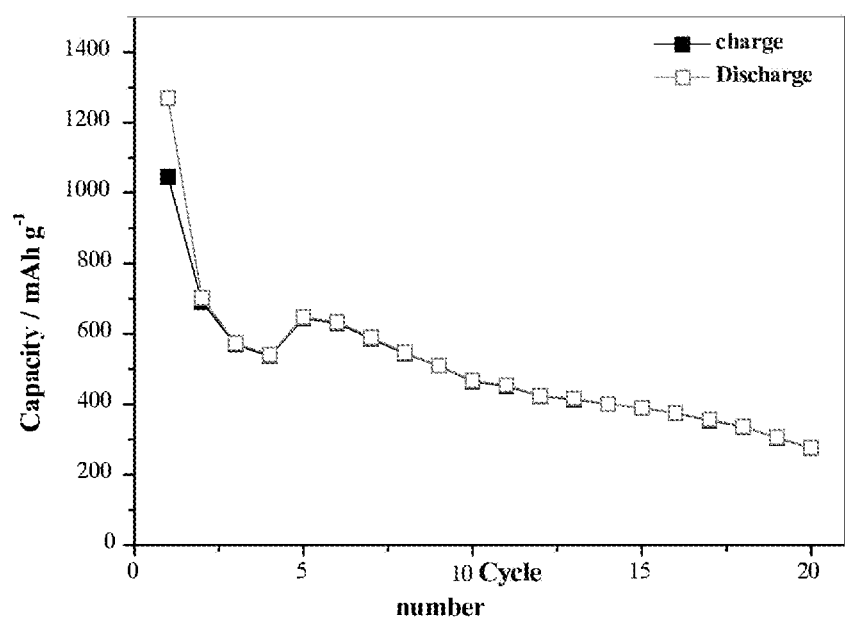
FIG. 15 depicts representative cycle performance of another non-limiting example of an electrochemical cell containing a black phosphorus-carbon composite anode.

Example 7. Electrochemical Properties of an Exemplary Battery Using Black Phosphorus-Carbon Composite An electrochemical cell was prepared in the same manner as Example 5, except for the replacement of the electrolyte with 1 M $NaPF_6$ in a mixture solvent of ethylene carbonate (EC) and dimethyl carbonate (DMC) (volume ratio of 1:1) without a fluorinated ethylene carbonate additive. With this electrochemical cell, the initial discharge capacity (FIG. 15) of the phosphorus-carbon composite anode at 0.4 A $g^{-1}$ was measured at only 1269.2 mAh $g^{-1}$, and the capacity quickly faded to lower than 300 mAh $g^{-1}$ after only 20 cycles. The results indicated the significant effect of electrolyte additive on the electrochemical performance of the electrode materials.

Figure 16:
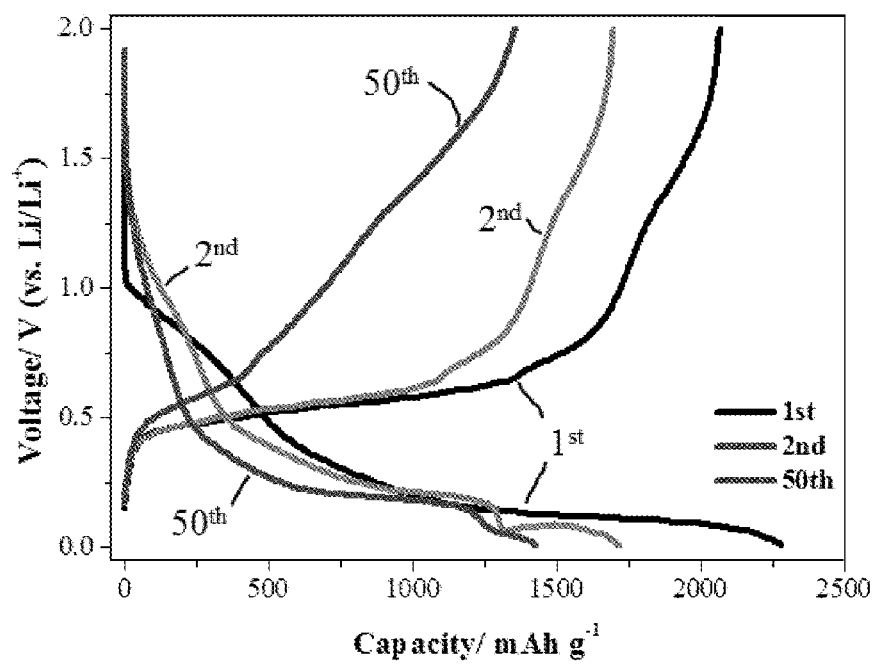
FIG. 16 depicts representative charge/discharge curves of another non-limiting example of an electrochemical cell containing a black phosphorus-carbon composite anode.
Figure 17:
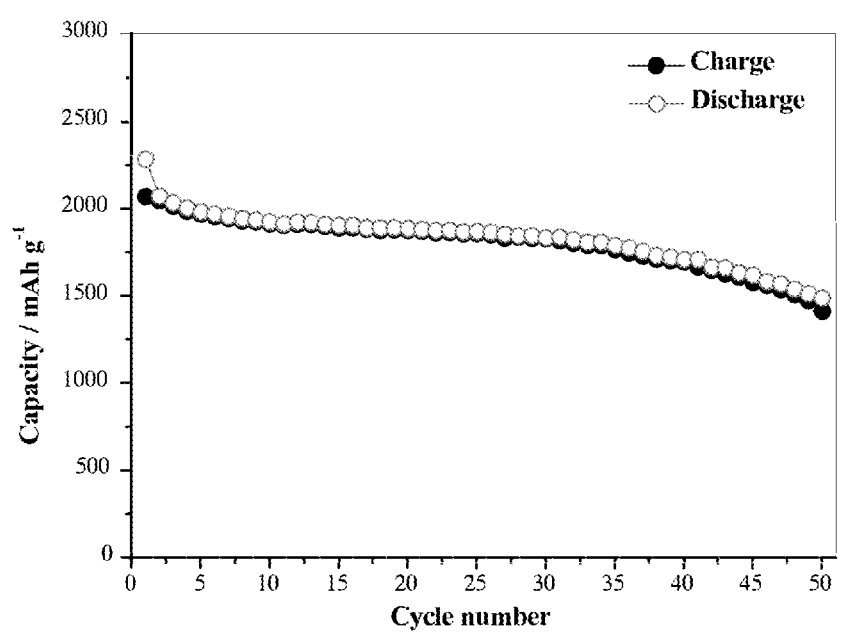
FIG. 17 depicts representative cycle performance of the electrochemical cell of FIG. 16.
Figure 18:
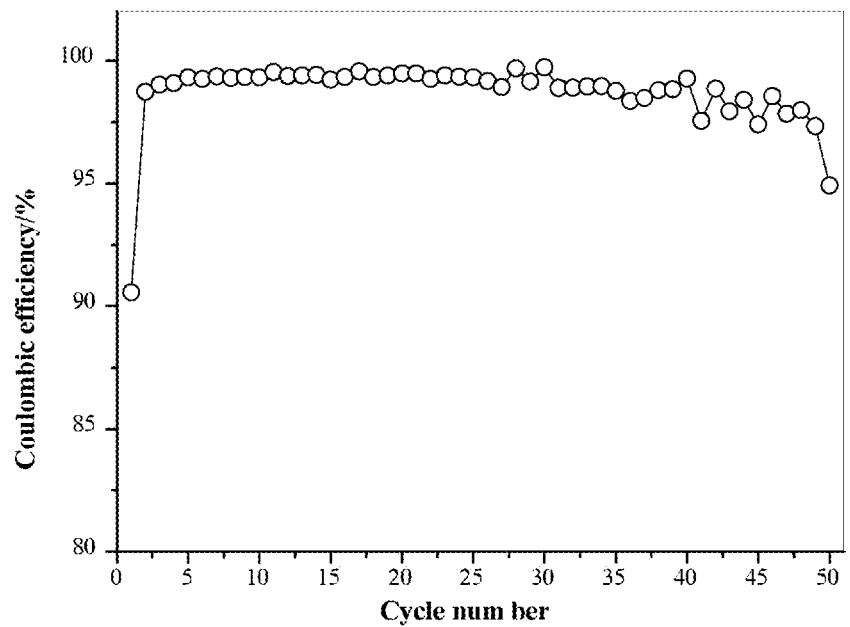
FIG. 18 depicts representative coulombic efficiency of the electrochemical cell of FIG. 16.

Example 8. Electrochemical Properties of an Exemplary Battery Using Black Phosphorus-Carbon Composite An electrochemical cell was prepared in the same manner as Example 5, except for the replacement of the sodium salt in the electrolyte with $NaClO_4$. In this way, the effect of the sodium salt on the specific capacity and cycle stability of the phosphorus-carbon composite anode was investigated. FIG. 16 depicts the charge/discharge profile of the phosphorus-carbon composite anode in 1 M $NaClO_4$/PC with 2 vol. % fluorinated ethylene carbonate additive. Most of the voltage characteristics were similar to that of the battery with the $NaPF_6$-based electrolyte except that a larger voltage polarization after tens of cycles was observed, which may be due to different mobility of sodium ions in the two electrolytes. The initial discharge capacity at 0.4 A $g^{-1}$ was measured at 2282.02 mAh $g^{-1}$, corresponding to a high phosphorus utilization of 87.8%. A reversible capacity of 2066.68 mAh $g^{-1}$ was obtained in the initial charge process, corresponding to a high initial coulombic efficiency of 90.6%. However, upon continuous sodiation/de-sodiation, the capacity gradually decreased. After 50 cycles, the discharge capacity of phosphorus-carbon composite was only 1485.9 mAh $g^{-1}$ (FIG. 17). The capacity retention after 50 cycles was only 65.1%, suggesting poor cycle stability. Meanwhile, the coulombic efficiency after 40 cycles also gradually decreased (FIG. 18), indicating that sodium was not completely extracted during the de-sodiation process.

Figure 19:
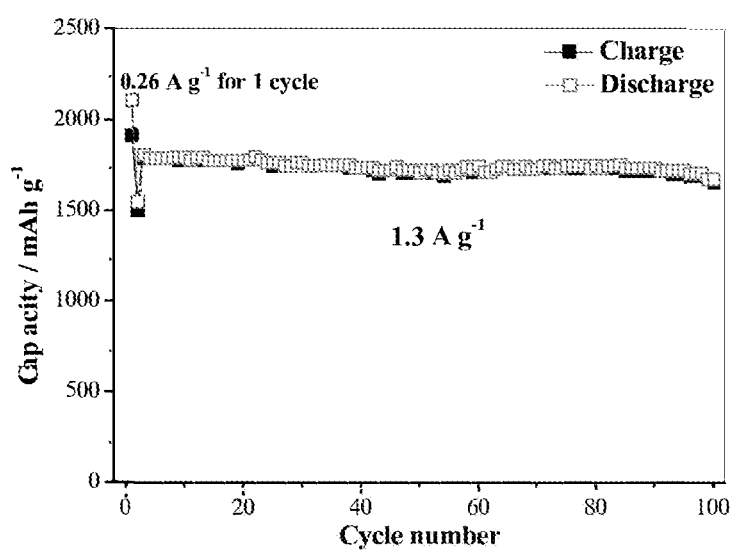
FIG. 19 depicts representative cycle performance of the electrochemical cell of FIG. 10.

Example 9. Cycle Performance of an Exemplary Battery Using Black Phosphorus-Carbon Composite Using the electrochemical cell of Example 5, the cell was tested at 0.26 A $g^{-1}$ for the $1^{st}$ cycle with an increase to 1.3 A $g^{-1}$ for the subsequent cycles. As shown in FIG. 19, the phosphorus-carbon composite anode demonstrates excellent cycle stability, a high reversible capacity of about 1700 mAh $g^{-1}$, and superior coulombic efficiency even at a higher charge/discharge current density.

Figure 20:
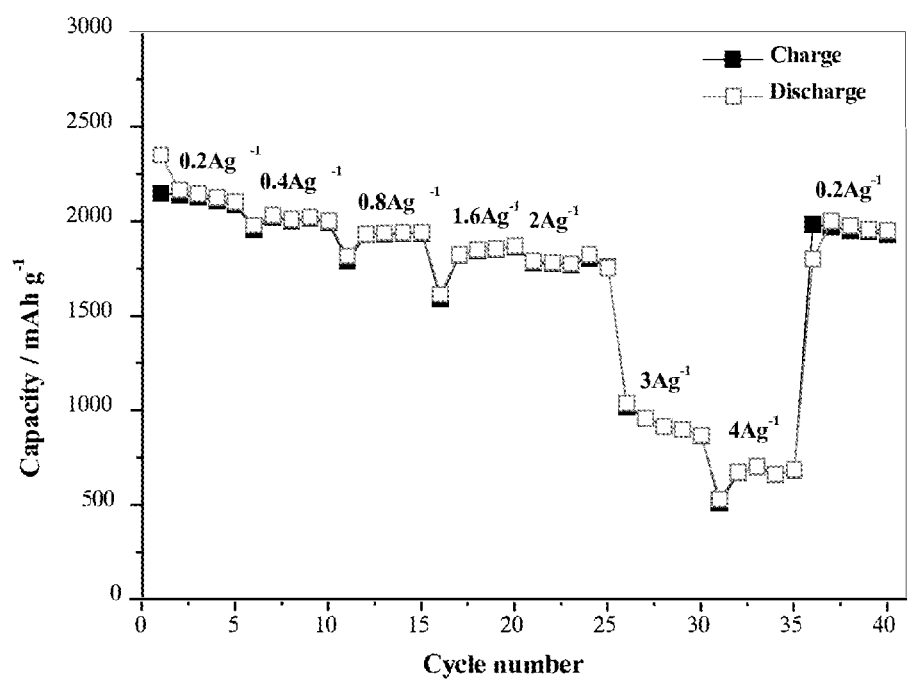
FIG. 20 depicts representative rate performance of the electrochemical cell of FIG. 10.

Example 10. Rate Performance of an Exemplary Battery Using Black Phosphorus-Carbon Composite Using the electrochemical cell of Example 5, the cell was tested at different charge/discharge rates. FIG. 20 shows the rate performance of the phosphorus-carbon composite anode with charge/discharge current density from 0.2 A $g^{-1}$ to 4 A $g^{-1}$. At a low current density of 0.2 A $g^{-1}$, an average reversible capacity of 2119 mAh $g^{-1}$ in 5 cycles was observed. When the current density was increased up to 2 A $g^{-1}$, an average capacity of over 1500 mAh $g^{-1}$ was still observed. Even at 4 A $g^{-1}$, the composite continued to deliver a high reversible capacity of ~640 mAh $g^{-1}$. When the rate was decreased back to 0.2 Ah $g^{-1}$, the specific capacity in the phosphorus-carbon composite anode recovered to 1953 mAh $g^{-1}$, which is 92.2% of the initial average capacity at 0.2 C.

Example 11 Electrochemical Performance of an Exemplary Sodium Ion Battery Using Black Phosphorus-Carbon Composite Anode and $Na_{0.66}Ni_{0.26}Zn_{0.07}Mn_{0.67}O_2$ Cathode An electrochemical cell was prepared in the same manner as Example 5 except that the lithium counter electrode was replaced by a $Na_{0.66}Ni_{0.26}Zn_{0.07}Mn_{0.67}O_2$-containing cathode. $Na_{0.66}Ni_{0.26}Zn_{0.07}Mn_{0.67}O_2$ cathode material was mixed with a Super-P® (conductive carbon material), PVDF (binder) and NMP (solvent) to form a homogenous slurry before being coated onto a support layer, dried, and punched out to obtain the cathode disk.

Figure 21A:
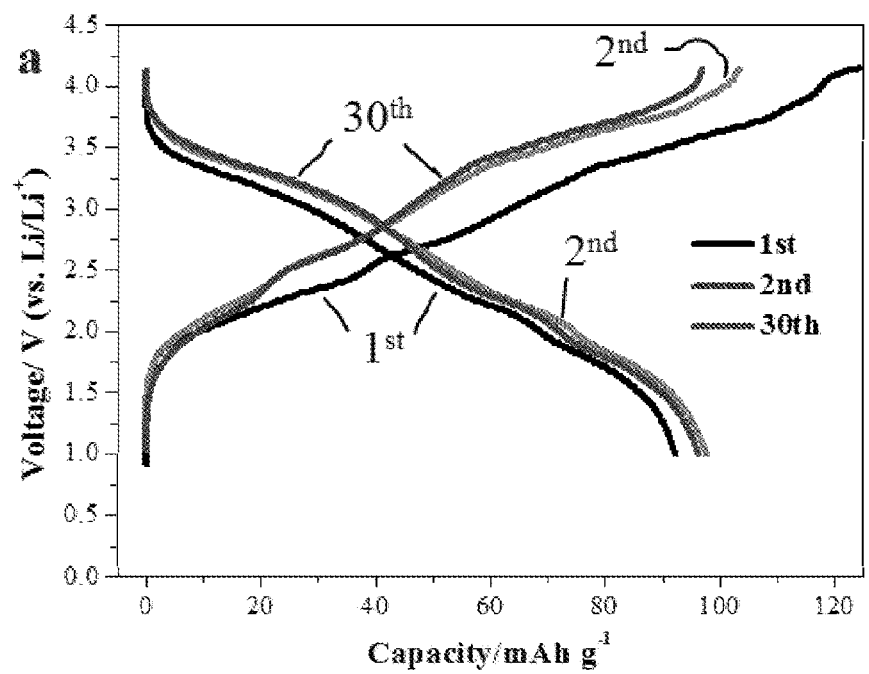
FIGS. 21A and 21B depict (a) representative charge/discharge curves and (b) representative cycle performance at 12 mA g$^{-1}$ of a non-limiting example of a Na$_{0.66}$Ni$_{0.26}$Zn$_{0.07}$Mn$_{0.67}$O$_2$/P sodium ion battery in 1 M NaPF$_6$/PC with 2 vol. % fluorinated ethylene carbonate additive.
Figure 21B:
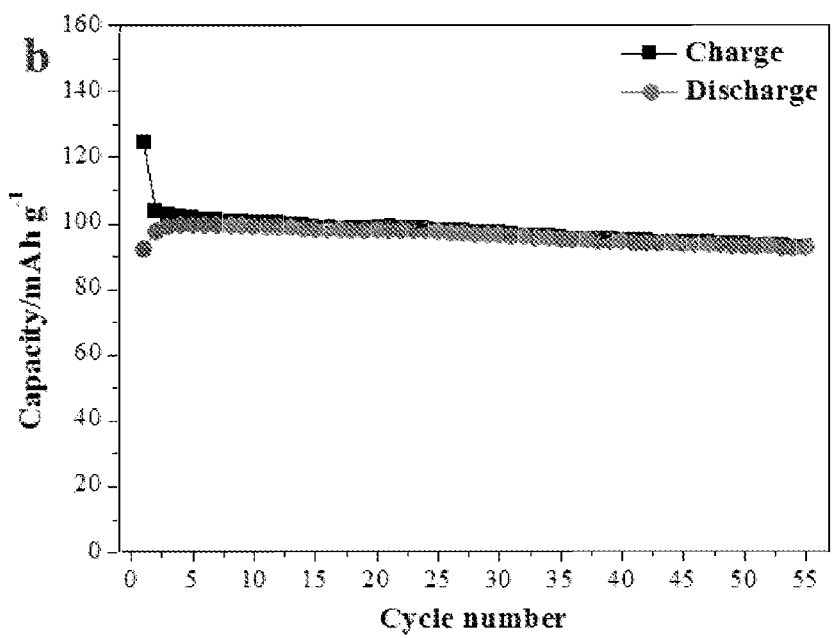
Figure 22A:
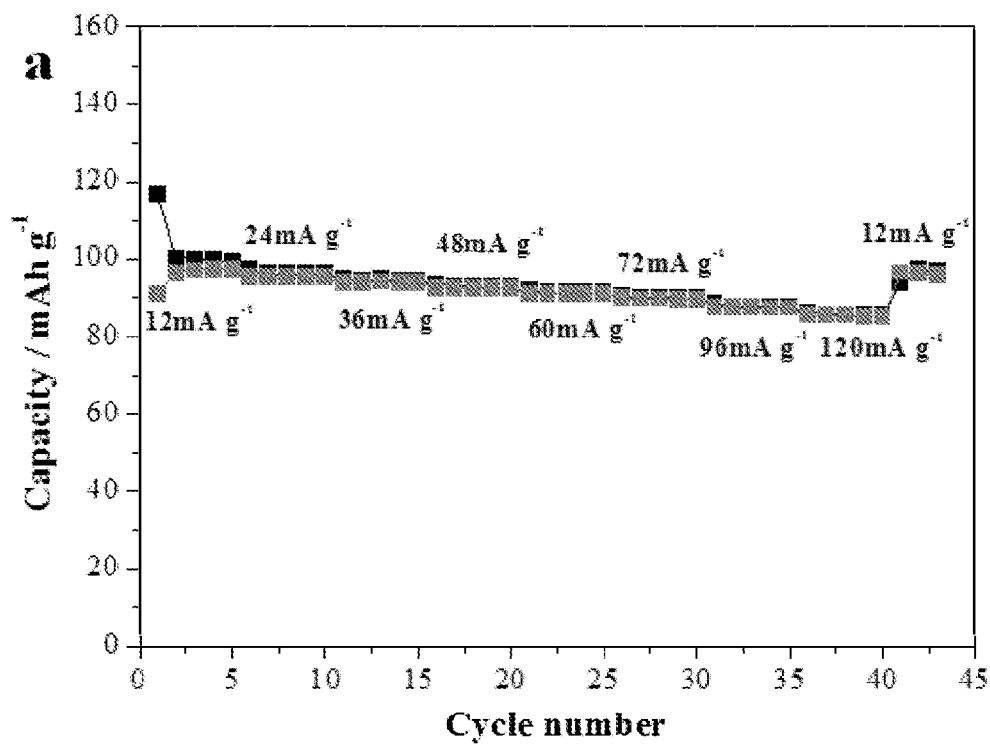
FIGS. 22A and 22B depict (a) and (b) rate performance of the Na$_{0.66}$Ni$_{0.26}$Zn$_{0.07}$Mn$_{0.67}$O$_2$/P sodium ion battery of FIG. 21.
Figure 22B:
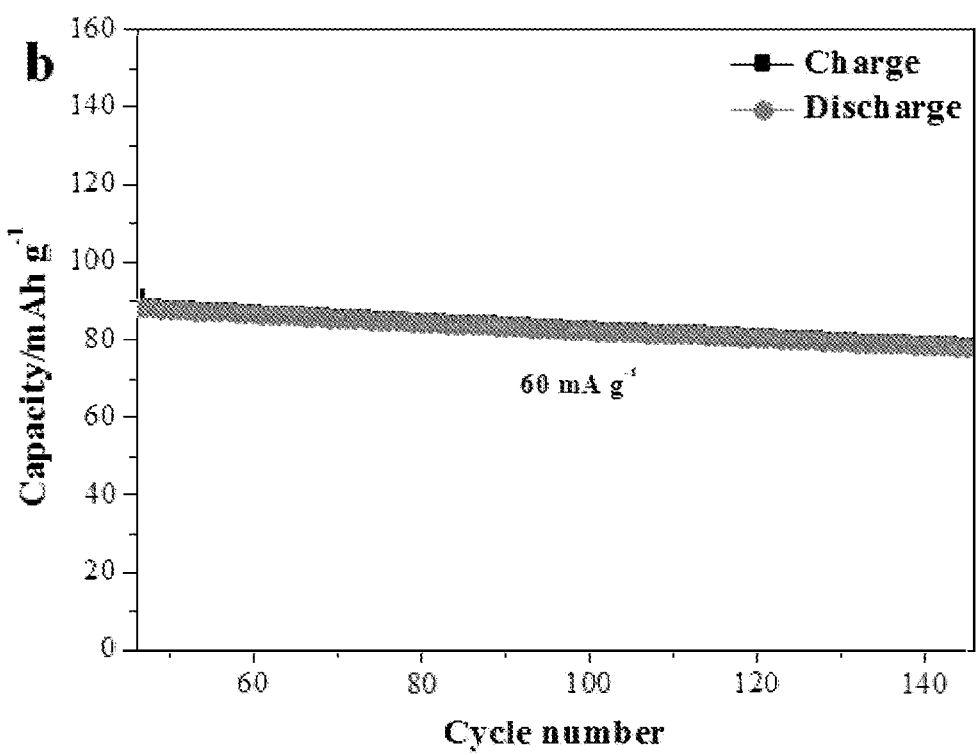

The $Na_{0.66}Ni_{0.26}Zn_{0.07}Mn_{0.67}O_2$/P sodium ion battery was tested at a constant current density of 12 mA $g^{1-}$ based on the active mass of $Na_{0.66}Ni_{0.26}Zn_{0.07}Mn_{0.67}O_2$ cathode. FIG. 21a illustrates the charge/discharge curves of the $Na_{0.66}Ni_{0.26}Zn_{0.07}Mn_{0.67}O_2$/P battery in the $1^{st}$, $2^{nd}$ and $30^{th}$ cycle. As shown, the battery delivered an initial charge capacity of 122.89 mAh $g^{-1}$ and an initial discharge capacity of 91.1 mAh $g^{-1}$ within a voltage range of 1-4.15 V, leading to an initial coulombic efficiency of about 74%. After an activation process, the $Na_{0.66}Ni_{0.26}Zn_{0.07}Mn_{0.67}O_2$/P battery maintained a stable reversible capacity of about 100 mAh $g^{-1}$ with coulombic efficiency of around 100% after 55 cycles (FIG. 21b). The rate performance test (FIG. 22a) of the $Na_{0.66}Ni_{0.26}Zn_{0.07}Mn_{0.67}O_2$/P battery shows that the reversible capacity had very little capacity fading when the charge/discharge rate was increased from 12 mA $g^{-1}$ to 120 mA $g^{-1}$. The capacity retention at 120 mA $g^{-1}$ was about 90% of that at 12 mA $g^{-1}$, indicating very high rate capability. When the rate was decreased back to 12 mA $g^{-1}$, the capacity was almost completely recovered. The cell was further cycled at 60 mA $g^{-1}$ after the rate performance test (FIG. 22b), delivering about 80 mAh $g^{-1}$ in the next 100 cycles, thereby illustrating very good cycle stability at high rate charge/discharge. All the capacities were calculated based on the active mass of $Na_{0.66}Ni_{0.26}Zn_{0.07}Mn_{0.67}O_2$ cathode material.

Figure 23:
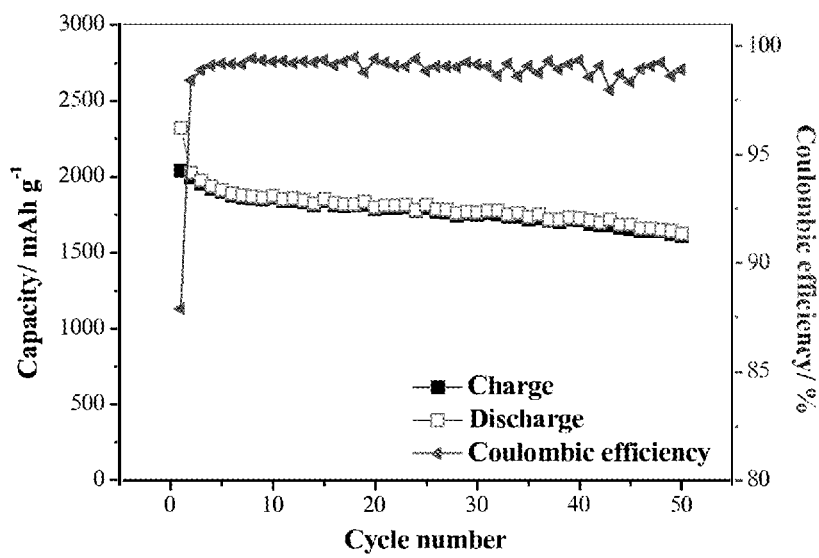
FIG. 23 depicts representative cycle performance at 0.4 A g$^{-1}$ of a non-limiting example of an electrochemical cell containing a red phosphorus-carbon composite with a phosphorus loading of 70 wt. %.

Example 12. Electrochemical Properties of an Exemplary Battery Using Red Phosphorus-Carbon Composite A red phosphorus-carbon composite and anode material were prepared in a similar manner as described in Example 1 and Example 5 except that the black phosphorus was replaced by red phosphorus. As shown in FIG. 23, the $1^{st}$ discharge capacity of the red phosphorus-carbon composite was measured to be 2317.6 mAh $g^{-1}$ with an initial coulombic efficiency of 87.8%. After 50 cycles of charge/discharge, a discharge capacity of 1624.9 mAh $g^{-1}$ was maintained, which was slightly lower than that of black phosphorus-carbon composite.

Figure 24:
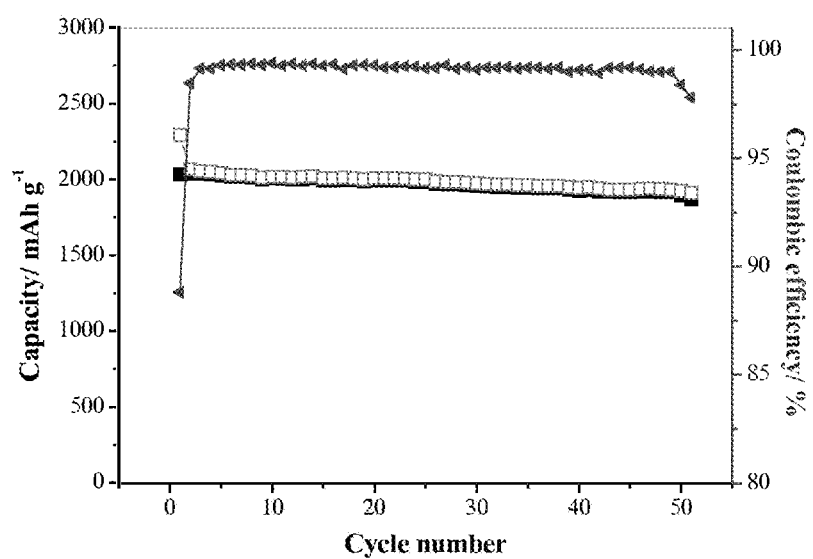
FIG. 24 depicts representative cycle performance at 0.4 A g$^{-1}$ of a non-limiting example of an electrochemical cell containing a black/red phosphorus-carbon composite with a phosphorus loading of 70 wt. %.

Example 13. Electrochemical Properties of an Exemplary Battery Using Black/Red Phosphorus-Carbon Composite A black/red phosphorus-carbon composite and anode material were prepared in a similar manner as described in Example 1 and Example 5, except that the black phosphorus was replaced by black phosphorus and red phosphorus in a weight ratio of 1/1. As shown in FIG. 24, the $1^{st}$ discharge capacity of the black/red phosphorus-carbon composite at 0.4 A $g^{-1}$ was measured to be 2293.7 mAh $g^{-1}$ with an initial coulombic efficiency of 88.8%. After 50 cycles of charge/discharge, a discharge capacity of 1913.9 mAh $g^{-1}$ was maintained, which was slightly higher than that of black phosphorus-carbon composite or that of red phosphorus-carbon composite. This may be due to a synergistic effect between black phosphorus and red phosphorus.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A sodium-ion battery comprising:
a cathode;
a non-aqueous electrolyte;
an anode; and
a separator between the cathode and the anode;
wherein:
the anode comprises a phosphorus-carbon composite comprising:
nano-sized phosphorus particles uniformly dispersed on a surface of a dual-component carbon matrix and/or pores of a dual-component carbon matrix;
the nano-sized phosphorus particles comprising black phosphorus; and
a dual-component conductive carbon matrix comprising:
a first component selected from the group consisting of graphene, reduced graphene oxide, acetylene black, carbon black, a metal-organic framework, porous carbon, carbon spheres, and carbon aerogel; and
a second component selected from the group consisting of single-walled carbon nanotubes, multi-walled carbon nanotubes, carbon nanofibers, carbon nanotube arrays, polypyrrole, and polyaniline;
the first component is present in an amount of about 1% to about 60% by weight of the phosphorus-carbon composite, and the second component is present in an amount of about 0.5% to about 30% by weight of the phosphorus-carbon composite; and
the phosphorus-carbon composite comprises the nano-sized phosphorus particles, the carbon black, and the multi-walled carbon nanotubes, and they are present in the phosphorus-carbon composite at a ratio of 7:2.5:0.5, respectively.

2. The sodium-ion battery of claim 1, wherein the cathode comprises one or more selected from the group consisting of a cathode active material, a current collector, a conductive carbon material, and a binder.

3. The sodium-ion battery of claim 1, wherein the nano-sized phosphorus particles further comprise red phosphorus.

4. The sodium-ion battery of claim 1, wherein the nano-sized phosphorus particles have a particle size of about 1 nm to about 200 nm.

5. The sodium-ion battery of claim 1, wherein the phosphorus-carbon composite has a dual-component conductive carbon matrix content of about 1% to about 70% by weight of the composite.

6. The sodium-ion battery of claim 1, wherein the phosphorus-carbon composite comprises the nano-sized phosphorus particles at about 0.1% to about 99.9% by weight.

* * * * *